Nov. 4, 1958 R. LUCIEN 2,859,006
RETRACTABLE AIRCRAFT LANDING GEAR
Filed May 3, 1955 2 Sheets-Sheet 1
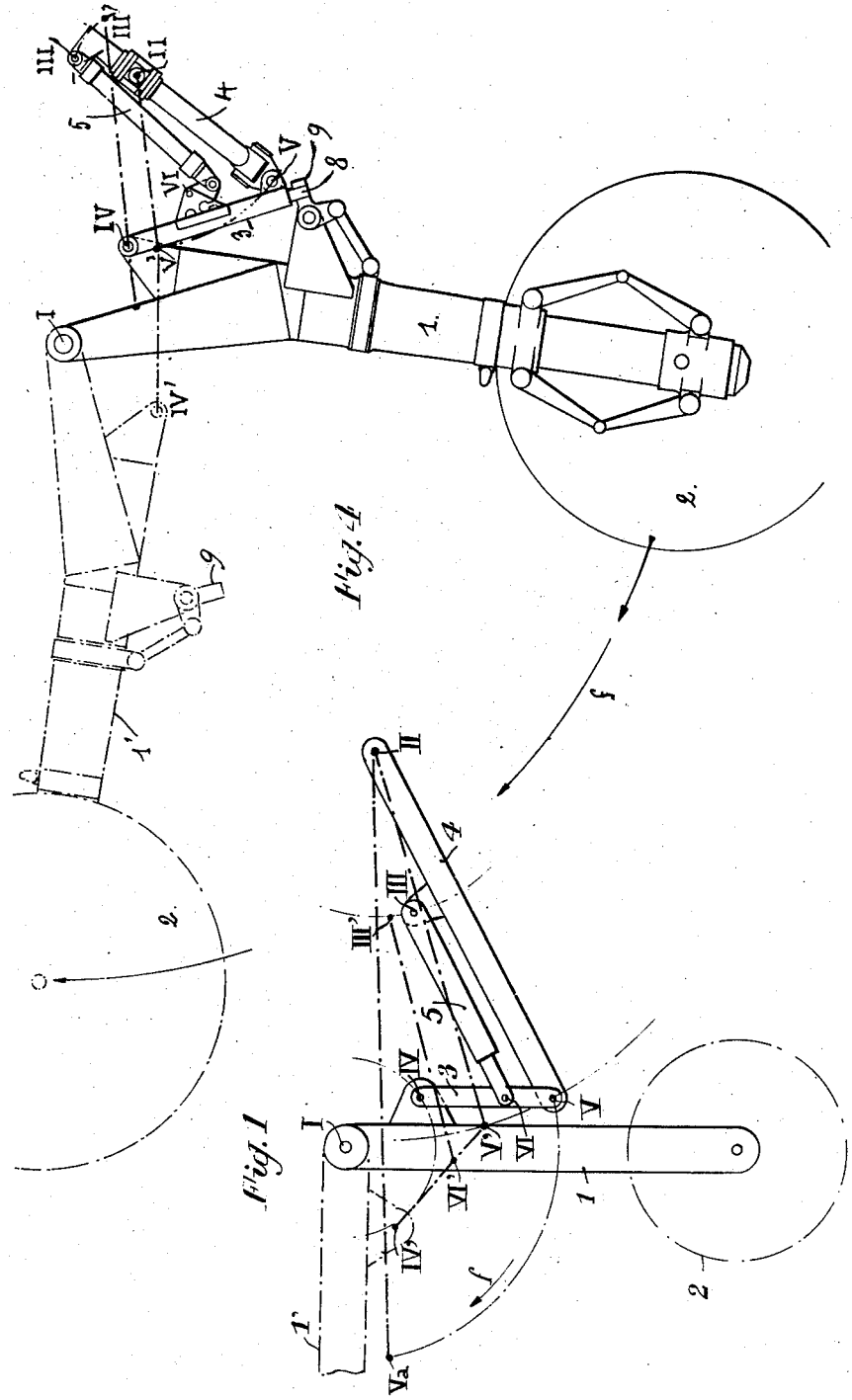

Nov. 4, 1958  R. LUCIEN  2,859,006
RETRACTABLE AIRCRAFT LANDING GEAR
Filed May 3, 1955  2 Sheets-Sheet 2
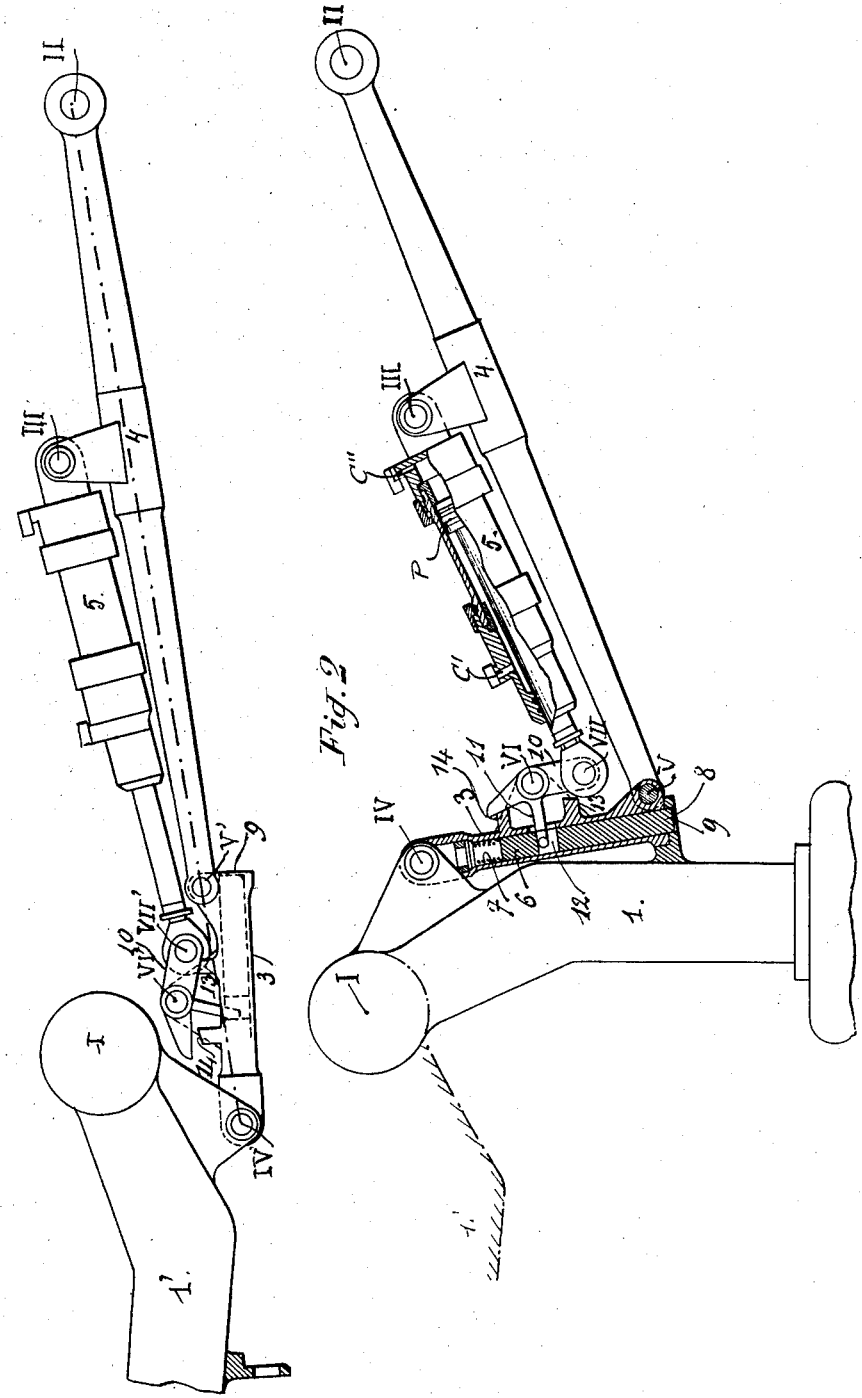

United States Patent Office 2,859,006
Patented Nov. 4, 1958

2,859,006

RETRACTABLE AIRCRAFT LANDING GEAR

René Lucien, Paris, France, assignor to Societe d'Inventions Aeronautiques et Mecaniques S. I. A. M., Fribourg, Switzerland, a corporation of Switzerland Application May 3, 1955, Serial No. 505,700

Claims priority, application France January 22, 1955

3 Claims. (Cl. 244—102)

This invention relates to aircraft landing gear, and more particularly to retraction devices for the same.

The invention has as an object the provision of a device for raising the landing-gear of aircraft, and is an improvement over known types of landing-gear in which a pivoted main leg is braced against wind pressure by a bracing strut and in which the raising or retraction is accompanied by an elongation of the bracing strut. This type of landing-gear requires a bracing strut which, when fully extended, has a considerable length, which results in serious drawbacks, especially that of excessive overall size.

The device provided in accordance with the invention removes these drawbacks by reducing the size of the bracing strut and associated raising jack to reasonable dimensions.

The principle of operation of the device is shown diagrammatically in Fig. 1.

Figs. 2 and 3 show a landing-gear provided with a device of the invention in lowered position and in the raised position respectively;

Fig. 4 shows in the two same positions, a further landing-gear arrangement in accordance with the invention.

These examples are not intended to be construed in any limiting sense; they are quite clearly capable of alternative forms of construction, depending on the structure of the aircraft to which they are fitted.

Referring now to Fig. 1 which diagrammatically illustrates the principle of the invention, 1 is the front leg of a landing-gear, the wheel of which is indicated at 2. The leg 1 is pivotally-fixed at I to the aircraft. It is shown at 1 in its lowered position and at 1' in a raised position attained by a rotating movement about the axis I in the direction of the arrow f. The leg 1 is braced against wind pressure by a bracing strut 4 pivotally-mounted on an axis II on the aircraft and to an axis V which is pivotally coupled to the landing leg 1. An examination of the figure will show that when the landing leg passes from the position 1 to the position 1', the bracing strut 4 would, without the benefits of the invention, have to be capable of a considerable extension, measured by the difference between the distances separating respectively the axes II—V and II—Va.

In the case of a device of the invention (as will hereinafter be described in detail with reference to Figs. 2–4), the bracing strut 4 is not extensible and, instead of being pivotally-fixed to a point on the landing leg, is pivoted on an axis V on a crank-arm 3 which is itself pivoted on an axis IV rigidly fixed to the leg 1 and closer to the rotational axis I of the landing leg than the axis V.

A jack 5 is pivotally-fixed, on the one hand to an axis III rigidly-fixed on the bracing strut 4, and on the other hand, on an axis VI which is integral with the crank-arm 3.

It will immediately be seen that an extension of the jack 5 will result in a thrust on the crank-arm 3 which is transmitted by the latter to the pivotal axis IV and thus causes the leg 1 to rotate in the direction of the arrow f, while the bracing strut 4 rotates in the same direction about the axis II. At the end of their respective travels, the various members take up the positions shown in chain-dotted lines and which are indicated by the same reference numbers with an index. It will be noted that the jack and the bracing strut are of comparatively small dimensions. The return movement to the lowered position is carried out by a reverse operation or it may be effected by the simple action of gravity, the jack 5, which may in this case be of the single-acting type, being set to exhaust. A hook or latch device is then necessary so as to retain the landing leg in its raised position.

Locking means are obviously necessary to fix the landing-gear in its lowered position. These may consist, for example, of a locking of the crank-arm 3 to the leg 1. This locking can be obtained by various means, for example hydraulic means or mechanical means. A mechanical locking arrangement will be subsequently noted.

There will now be described, with reference to Figs. 2 and 3, a raising device in accordance with the invention, in which the pivotal points of the bracing strut 4 and the crank-arm 3 are actually in a straight line in the raised position of the landing-gear, and for which a hooking or latch device would be either superfluous or an additional safety device.

In these figures, there will be found with the same reference numbers, the same members as those already shown diagrammatically in Fig. 1. The lower portion of the leg 1 has been omitted.

In this form, the jack 5 is of the double-acting type, the piston P being adapted to receive the fluid under pressure on either the one or the other of its two faces through conduits C' and C". The device for locking the landing-gear in its lowered position is, in this case, wholly mechanical and is described below.

The crank-arm 3 is a tube in which is adapted to move a locking slider 6 controlled by a spring 7. In the lowered position, the slider 6 under the pressure of the spring 7 has its extremity 8 engaged in a striking plate 9 rigidly fixed to the leg 1. The jack 5, instead of being pivoted on the axis VI which is fixed to the crank-arm 3, is pivoted at VII on a lever 10 movable about the axis VI, and which carries a finger 11, the latter being engaged in a housing 12 in the slider.

The operations of raising the landing-gear proceed as follows:

When the jack begins to extend, the lever 10 rocks about its axis VI, and the finger 11 raises the slider 6, compressing the spring 7, and thus frees the bolt 8 from the striking plate 9. The lever 10 then comes into contact with the abutment 13 which is rigidly fixed on the crank-arm 3 and applies a thrust to the crank-arm to cause the landing-gear to be raised to the position shown in Fig. 3. In this position the three axes II, V' and IV' are in a same plane. Movement in the opposite direction is impossible even in the absence of pressure on the jack.

The lowering operation is carried out in the reverse order: The retraction of the jack first of all causes the lever 10 to rock, which moves the bolt 8 to project again from the extremity of the crank-arm 3, after which the lever 10 by pushing on the abutment member 14 swings the crank-arm 3 around the axis IV' to disrupt the alignment of axes II, V' and IV' in a same plane. The pull exerted by the jack is then applied to this crank-arm and brings the leg 1 of the landing-gear into its lowered position. When it reaches this position, the striking plate 9 raises the bolt 8 which is first of all forced back to compress the spring 7, and then finally engages in the striking plate due to the return action of the spring 7.

In Fig. 4, there has been shown a further form of embodiment of a lifting device according to the invention, in which the pivotal axes II, V, IV, in the raised position form a broken line which enables the landing-gear to descend under the action of its own weight, the jack 5 then being of the single-acting type. The operation is the same as that previously described. The members corresponding to those shown in Figs. 2 and 3 have been given the same reference numbers. In the raised position of the landing gear, shown in chain-dotted lines, the same reference numbers are indexed. The rod of the jack 5 is connected indirectly to the crank-arm 3 through a lever 10 equivalent to the similarly referenced lever 10 of Figs. 2 and 3. The pivotal axis of the lever 10 is shown at VI. The lever 10 operates to disengage the bolt 8 from the striking plate 9 when the jack 5 begins to extend. The crank-arm 3 viewed in longitudinal section is identical to that of Fig. 2.

What I claim is:

1. Retractable landing gear for aircraft, comprising a landing leg hinged at its upper end to a location of the aircraft, a bracing strut hinged at one end to another location of the aircraft, a tubular crank arm hinged at one end to said landing leg and at the other end to the other end of said bracing strut, a recessed abutment on said landing leg positioned to register with said other end of said crank arm with the landing gear in extended position, a slider positioned inside said tubular crank arm having a notch therein and an end extensible from said crank arm into said recessed abutment, a spring urging said slider outwardly from said crank arm, a lever pivoted on said crank arm, abutments on said crank arm limiting pivotal movement of said lever between two end positions, a finger extending from said lever to engage said slider notch through a longitudinal slot in said crank arm, and at least one jack hinged to said strut and to said lever.

2. A landing gear as in claim 1 wherein said jack is of the double-acting type and connected to said strut and lever for the hinge axes of said strut to the aircraft, of said crank arm to said strut, and of said landing leg to said crank arm to lie in a same plane with said jack extended and the landing gear retracted.

3. A landing gear as in claim 1 wherein said jack is of the single-acting type and connected to said strut and lever for the hinge axes of said strut to the aircraft and of said lever to said strut to be contained in a plane different from the plane containing the hinge axes of said strut to said crank arm and of said crank arm to said landing leg with said jack extended and the landing gear retracted.

References Cited in the file of this patent

UNITED STATES PATENTS

| | | |
|---|---|---|
| 2,280,185 | Bridges | Apr. 21, 1942 |
| 2,323,640 | Armstrong | July 6, 1943 |
| 2,387,628 | Waseige | Oct. 23, 1945 |
| 2,529,401 | Lawson | Nov. 7, 1950 |

FOREIGN PATENTS

| | | |
|---|---|---|
| 979,516 | France | Dec. 13, 1950 |